United States Patent
Zhang et al.

(10) Patent No.: US 10,380,103 B2
(45) Date of Patent: Aug. 13, 2019

(54) OBJECT DATA UPDATING METHOD AND APPARATUS IN AN OBJECT STORAGE SYSTEM

(71) Applicant: BEIJING BAIDU NETCOM SCIENCE AND TECHNOLOGY CO., LTD., Beijing (CN)

(72) Inventors: Chen Zhang, Beijing (CN); Fenqiang Yang, Beijing (CN)

(*) Notice: Subject to any disclaimer, the term of this patent is extended or adjusted under 35 U.S.C. 154(b) by 343 days.

(21) Appl. No.: 15/246,112

(22) Filed: Aug. 24, 2016

(65) Prior Publication Data
US 2017/0193034 A1 Jul. 6, 2017

(30) Foreign Application Priority Data
Jan. 4, 2016 (CN) .......................... 2016 1 0004530

(51) Int. Cl.
| | | |
|---|---|---|
| G06F 17/30 | (2006.01) | |
| G06F 16/23 | (2019.01) | |
| G06F 16/22 | (2019.01) | |
| G06F 16/28 | (2019.01) | |

(52) U.S. Cl.
CPC .......... *G06F 16/2379* (2019.01); *G06F 16/22* (2019.01); *G06F 16/289* (2019.01)

(58) Field of Classification Search
CPC ................................................ G06F 17/30377
See application file for complete search history.

(56) References Cited

U.S. PATENT DOCUMENTS

| | | | | |
|---|---|---|---|---|
| 8,171,101 B2 * | 5/2012 | Gladwin | ............. | H04L 67/1097 370/242 |
| 8,200,788 B2 * | 6/2012 | Leggette | ........... | G06F 17/30233 709/203 |
| 8,281,181 B2 * | 10/2012 | Resch | ..................... | G06F 11/10 714/6.2 |
| 8,285,878 B2 * | 10/2012 | Gladwin | ............... | G06F 3/0617 709/203 |

(Continued)

FOREIGN PATENT DOCUMENTS

| | | |
|---|---|---|
| CN | 102929958 A | 2/2013 |
| JP | 7-44440 A | 2/1995 |

(Continued)

*Primary Examiner* — Syed H Hasan
(74) *Attorney, Agent, or Firm* — Seed IP Law Group LLP

(57) ABSTRACT

The present application discloses an object data updating method and apparatus in an object storage system. The method according to an embodiment includes: receiving an object data updating request of a user, the object data updating request comprising a type of the updating request and identity information of the object data to be updated; obtaining the metadata of the object data to be updated based on the identity information of the object data to be updated; executing a first predefined operation on the metadata of the object data to be updated based on the type of the updating request; obtaining the actual data of the object data to be updated based on the identity information of the object data to be updated; and executing a second predefined operation on the actual data of the object data to be updated based on the type of the updating request. The embodiment achieves efficient deletion/copying of the object data in the object storage system.

13 Claims, 6 Drawing Sheets

(56) References Cited

U.S. PATENT DOCUMENTS

| | | | | |
|---|---|---|---|---|
| 8,352,501 | B2* | 1/2013 | Baptist | G06F 11/1448 |
| | | | | 707/793 |
| 8,386,798 | B2* | 2/2013 | Dodgson | G06F 11/1458 |
| | | | | 711/161 |
| 8,392,682 | B2* | 3/2013 | Dodgson | H04L 69/40 |
| | | | | 711/163 |
| 8,479,078 | B2* | 7/2013 | Resch | G06F 11/1076 |
| | | | | 714/763 |
| 8,566,354 | B2* | 10/2013 | Grube | G06F 11/0727 |
| | | | | 375/240.03 |
| 8,595,435 | B2* | 11/2013 | Cilfone | G06F 11/1076 |
| | | | | 711/114 |
| 9,311,187 | B2* | 4/2016 | Resch | G06F 11/1092 |
| 10,078,468 | B2* | 9/2018 | Ober | G06F 3/067 |
| 10,079,887 | B2* | 9/2018 | Motwani | H04L 67/1097 |
| 10,089,176 | B1* | 10/2018 | Donlan | G06F 11/1076 |
| 10,095,578 | B2* | 10/2018 | Resch | H04L 67/06 |
| 2007/0079083 | A1* | 4/2007 | Gladwin | G06F 21/6227 |
| | | | | 711/154 |
| 2007/0162515 | A1* | 7/2007 | Sarma | G06F 16/10 |
| 2013/0212070 | A1 | 8/2013 | Saika et al. | |
| 2015/0169253 | A1 | 6/2015 | Donlan | |
| 2015/0186043 | A1 | 7/2015 | Kesselman et al. | |

FOREIGN PATENT DOCUMENTS

JP           2004-38400 A    2/2004
WO      2014/203397 A1   12/2014

* cited by examiner

OBJECT DATA UPDATING METHOD AND APPARATUS IN AN OBJECT STORAGE SYSTEM

CROSS REFERENCE TO RELATED APPLICATION

This application claims the priority of Chinese Patent Application No. 201610004530.2, entitled "Object Data Updating Method and Apparatus in an Object Storage System," filed on Jan. 4, 2016, the content of which is incorporated herein by reference in its entirety.

TECHNICAL FIELD

The present application relates to the field of computer technology, specifically to the field of data storage technology, and more specifically to an object data updating method and apparatus in an object storage system.

BACKGROUND

In cloud computing service, object storage service is a very important basic service. In the object storage service, data is written into a user's storage area as an object. The user can write, read and delete objects in that storage area.

In the existing object storage system, the maximum supported size of a single piece of object data is 5 T. When the object data is stored in the existing object storage system, the object data is generally divided into slices for storage. The relation between the object data and the slices is maintained by metadata.

In general, user operations on the object data include a copying operation and a deletion operation.

With regard to the deletion operation, existing solutions can be divided into two types:
1. direct deletion: data slices and metadata related to an object are directly deleted after the operation to delete the object is initiated by a user;
2. garbage collection: the physical space for an object is not released until a periodic conventional garbage scanning is performed rather than being released immediately during the deletion.

With regard to the copying operation, existing solutions use direct copying.

With regard to the existing direct copying operation and the direct deletion operation, the processing logic is complex, and failure occurs easily. In particular, when the object data is big, hundreds of thousands of slices may be involved in the copying/deletion operation. If abnormality or failure occurs during the processing, it not only possibly leads to the creation of garbage or incomplete data, but also easily leads to the inconsistency of metadata. In addition, when the object data is big, the process time of the copying/deletion operation is long, leading to a noticeable stress on the object storage system. If multiple users simultaneously initiate a large number of copying/deletion operations, causing sudden increase in the system load is caused, corresponding operations may even cease to be executed.

The main disadvantage of the garbage collection solution in the existing deletion operation is the waste of the storage space.

SUMMARY

An object of the present application is to provide an improved object data updating method and apparatus in an object storage system, in order to solve the technical problems mentioned in the foregoing background section.

In a first aspect, the present application provides an object data updating method in an object storage system, wherein multiple object data is stored in the object storage system, each piece of the object data includes metadata and actual data stored in slices, the method includes: receiving an object data updating request of a user, wherein the object data updating request includes a type of the updating request and identity information of object data to be updated; obtaining the metadata of the object data to be updated based on the identity information of the object data to be updated; executing a first predefined operation on the metadata of the object data to be updated based on the type of the updating request; obtaining the actual data of the object data to be updated based on the identity information of the object data to be updated; and executing a second predefined operation on the actual data of the object data to be updated based on the type of the updating request.

In some embodiments, the type of the updating request includes a copying request, the object data to be updated includes object data to be copied, and the identity information of object data to be updated includes source storage address information and target storage address information of the object data to be copied; the executing a first predefined operation on the metadata of the object data to be updated based on the type of the updating request includes: storing the metadata of the object data to be copied in a target storage address as the metadata of target object data; and the executing a second predefined operation on the actual data of the object data to be updated based on the type of the updating request includes: storing the actual data of the object data to be copied in a target storage address as the actual data of the target object data.

In some embodiments, the storing the metadata of the object data to be copied in a target storage address as the metadata of the target object data includes: adding a copying task identifier in the metadata of the object data to be copied.

In some embodiments, the metadata of the object data to be copied includes current slicing information of the actual data of the object data to be updated; after copying the actual data of the object data to be copied to the target storage address to generate the actual data of the target object data, the method further includes: deleting the copying task identifier; and updating the metadata of the target object data, resulting in the metadata of the target object data including the current slicing information of the actual data of the target object data.

In some embodiments, the type of the updating request includes a deletion request; the object data to be updated includes object data to be deleted; the metadata of the object data to be deleted includes current slicing information of the actual data of the object data to be deleted and historical slicing information of the actual data of the object data to be deleted; the executing a first predefined operation on the metadata of the object data to be updated based on the type of the updating request includes: deleting the current slicing information of the actual data of the object data to be deleted; and the executing a second predefined operation on the actual data of the object data to be updated based on the type of the updating request includes: deleting the actual data of the object data to be deleted.

In some embodiments, after deleting the actual data of the object data to be deleted, the method further includes: deleting the historical slicing information in the metadata of the object data to be deleted.

In some embodiments, the object data updating request includes user identity information; the receiving an object data updating request of a user includes: determining operation privilege of the user based on the user identity information; the obtaining the metadata of the object data to be updated based on the identity information of the object data to be updated includes: obtaining the metadata of the object data to be updated based on predefined operation privilege of the user; and the obtaining the actual data of the object data to be updated based on the identity information of the object data to be updated includes: obtaining the actual data of the object data to be updated based on the predefined operation privilege of the user.

In a second aspect, the present application provides an object data updating apparatus in an object storage system, wherein multiple object data is stored in the object storage system, each piece of object data includes metadata and actual data stored in slices, and the apparatus includes: a receiving module configured to receive an object data updating request of a user, wherein the object data updating request includes a type of the updating request and identity information of object data to be updated; a first obtaining module configured to obtain the metadata of the object data to be updated based on the identity information of the object data to be updated; a first execution module configured to execute a first predefined operation on the metadata of the object data to be updated based on the type of the updating request; a second obtaining module configured to obtain the actual data of the object data to be updated based on the identity information of the object data to be updated; and a second execution module configured to execute a second predefined operation on the actual data of the object data to be updated based on the type of the updating request.

In some embodiments, the type of the updating request includes a copying request, and the object data to be updated includes object data to be copied; the identity information of object data to be updated includes source storage address information and target storage address information of the object data to be copied; the first execution module includes a first copying unit configured to store the metadata of the object data to be copied in a target storage address as the metadata of the target object data; and the second execution module includes a second copying unit configured to store the actual data of the object data to be copied in a target storage address as the actual data of the target object data.

In some embodiments, the first copying unit is further configured to: add a copying task identifier in the metadata of the object data to be copied.

In some embodiments, the metadata of the object data to be copied include current slicing information of the actual data of the object data to be updated; the apparatus further includes a metadata updating module configured to, after the second copying unit stores the actual data of the object data to be copied in the target storage address as the actual data of the target object data, delete the copying task identifier, and update the metadata of the target object data, resulting in the metadata of the target object data including the current slicing information of the actual data of the target object data.

In some embodiments, the type of the updating request includes a deletion request; the object data to be updated includes object data to be deleted; the metadata of the object data to be deleted includes current slicing information of the actual data of the object data to be deleted and historical slicing information of the actual data of the object data to be deleted; the first execution module includes a first deletion unit configured to delete the current slicing information in the metadata of the object data to be deleted; and the second execution module includes a second deletion unit configured to delete the actual data of the object data to be deleted.

In some embodiments, the second deletion unit is further configured to: delete the historical slicing information in the metadata of the object data to be deleted after deleting the actual data of the object data to be deleted.

In some embodiments, the object data updating request includes user identity information; the receiving module further includes a privilege determining unit configured to determine operation privilege of the user based on the user identity information; the first execution module is further configured to: obtain the metadata of the object data to be updated based on predefined operation privilege of the user determined by the privilege determining unit; and the second execution module is further configured to: obtain the actual data of the object data to be updated based on the predefined operation privilege of the user determined by the privilege determining unit.

According to the object data updating method and apparatus in the object storage system provided by the present application, when the user requests to copy/delete the object data, the copying/deletion operation is respectively executed on the metadata and the actual data of the object data, so as to improve the efficiency of the copying/deletion operation.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that, the embodiments in the present application and the features in the embodiments may be combined with each other on a non-conflict basis. The present application will be described below in detail with reference to the accompanying drawings and in combination with the embodiments.

Figure 1:
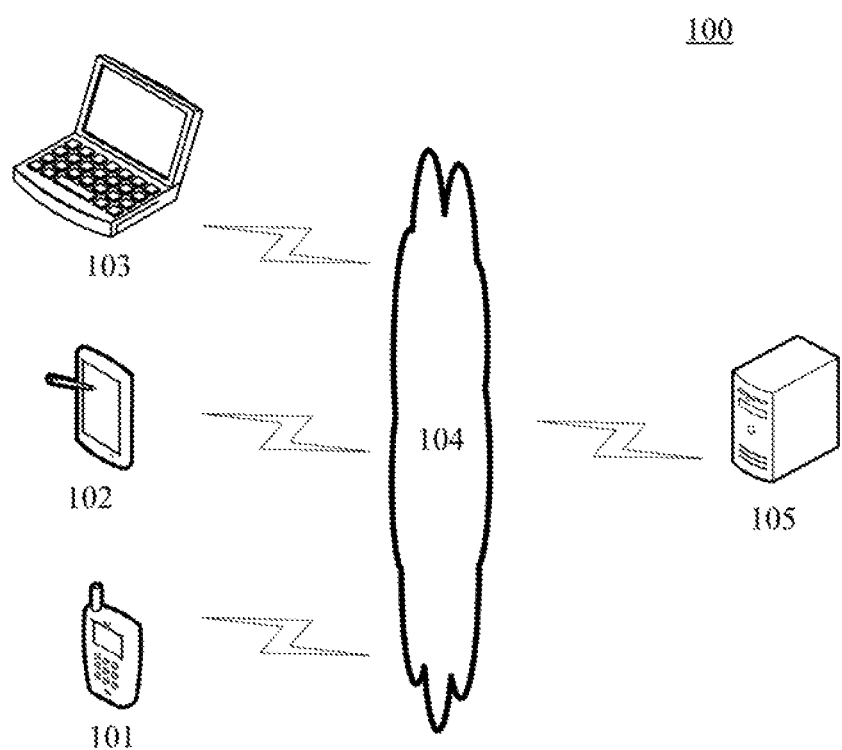
FIG. 1 is an architectural diagram of an exemplary system in which the present application may be implemented.

FIG. 1 shows an exemplary architecture of a system 100 to which may be used by an object data updating method or apparatus in an object storage system according to an embodiment of the present application.

As shown in FIG. 1, the system 100 may include terminal devices 101, 102 and 103, a network 104 and a server 105. The network 104 serves as a medium providing a communication link between the terminal devices 101, 102 and 103 and the server 105. The network 104 can include various types of connection, such as a wired or wireless communication link or an optical fiber cable, etc.

The user may use the terminal devices 101, 102 and 103 to interact with the server 105 through the network 104 to transmit or receive messages etc. Various communication client applications, such as cloud storage applications, shopping applications, search applications, instant messaging tools, mailbox clients, social platform software etc., may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing diverse services, for example, a storage server executing a corresponding copying or deletion operation according to a data copying or deletion request from the terminal devices 101, 102 or 103. The storage server may perform a corresponding process on data according to the received data copying or deletion request, and feed back a processing result (for example, a copying success message, a deletion success message) to the terminal devices.

It should be noted that the object data updating method according to the embodiments of the present application is generally executed by the server 105, and accordingly, an object data updating apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
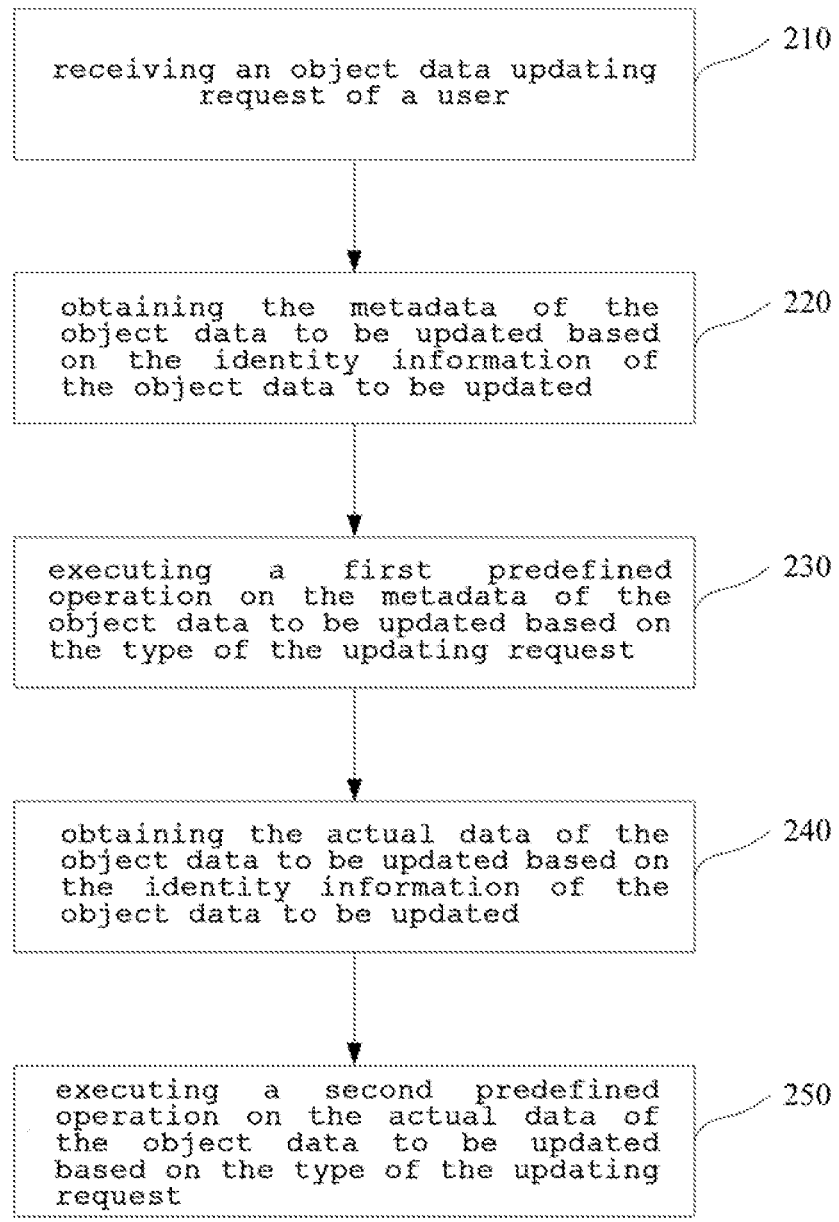
FIG. 2 is a flowchart illustrating an object data updating method in an object storage system according to an embodiment of the present application.

Further referring to FIG. 2, a process 200 of an object data updating method in an object storage system according to an embodiment of the present application is illustrated. Multiple pieces of object data are stored in the object storage system, and each piece of the object data includes metadata and actual data stored in slices.

In the object storage system, the object data are basic storage units. Each object data further includes the metadata and the actual data.

Metadata are data used for characterizing the object data. For example, the metadata may be used to describe the storage position, the historical operation record and the like of the object data.

In some application scenarios, the actual data in the object data may need to occupy a larger storage space. Therefore, to make full use of the storage space, the actual data may be divided into a plurality of slices. These slices are stored in the same storage area or different storage areas. The metadata may include information on the slices of the actual data, for example, information relating to the size of each slice, the storage position of each slice etc.

The method includes the following steps:

Step 210, an object data updating request of a user is received, wherein the object data updating request includes a type of the updating request and identity information of object data to be updated.

In the embodiment, an electronic device (for example, the server as shown in FIG. 1) on which the object data updating method operates may receive the object data updating request from a terminal used by the user in a wired or wireless connection mode. It should be noted that the wireless connection mode may include, but not limited to, 3G/4G connection, WiFi connection, Bluetooth connection, WiMAX connection, Zigbee connection, UWB (Ultra Wide-Band) connection, as well as other wireless connection modes which are known at present or will be developed in the future.

Herein, the updating request may exemplarily be understood as a request intended to generate influence on the object data stored in the object storage system, thus causing changes in the object data (for example, the storage position of the object data) stored in the object storage system.

In some optional implementations, for example, the type of the updating request may include, but not limited to, cut, copying and/or deletion.

For example, the identity information of the object data to be updated may be identifiers each of which is corresponding to one of the object data in the object storage system. The object data may be accessed through the identifier, and thus an operation corresponding to the updating request is executed on the object data.

Step 220, the metadata of the object data to be updated is obtained based on the identity information of the object data to be updated.

As mentioned above, the identity information may be the identifier corresponding to one of the object data in the object storage system. Therefore, the metadata in the object data may be obtained through the identity information.

Step 230, a first predefined operation is executed on the metadata of the object data to be updated based on the type of the updating request.

As mentioned above, for example, the type of the updating request may include, but not limited to, cut, copying and/or deletion. After the updating request is received, an operation corresponding to the type of the updating request, such as cut, copying and/or deletion, may be first executed on the metadata in the object data in this step.

Step 240, the actual data of the object data to be updated are obtained based on the identity information of the object data to be updated.

Similar to step 220, the storage position of the object data to be updated may be obtained through the identifier (namely, the identity information) in one-to-one correlation with the object data to be updated in the object storage system. Therefore, the actual data of the object data to be updated may be obtained.

Since the actual data of the object data are stored in slices, in some application scenarios, the slices in the object data may be stored at different locations in the object storage system. In these application scenarios, for example, the metadata of the object data to be updated may be obtained through the identifier in one-to-one correlation with the object data to be updated, and the storage positions of the slices in the object data to be updated are obtained by querying the metadata, and then, the actual data of the object data to be updated may be obtained.

Step 250, a second predefined operation is executed on the actual data of the object data to be updated based on the type of the updating request.

Similar to step 230, after the actual data of the object data to be updated is obtained, an operation corresponding to the type of the updating request, such as cut, copying and/or deletion, may be executed on the actual data of the object data in this step.

Herein, the first predefined operation executed on the metadata of the object data to be updated and the second predefined operation executed on the actual data of the object data to be updated are the operations corresponding to the type of the updating request. However, in different application scenarios, the first predefined operation executed on the metadata of the object data may be the same as or different from the second predefined operation executed on the actual data of the object data.

In some optional implementations, the object data updating request may further include user identify information.

In these implementations, receiving the object data updating request of the user in the step 210 of the object data updating method in the object storage system according to the present embodiment may further include: determining operation privilege of the user based on the user identity information.

Obtaining the metadata of the object data to be updated based on the identity information of the object data to be updated in the step 220 may further include: obtaining the metadata of the object data to be updated if the user has a predefined operation privilege.

In addition, obtaining the actual data of the object data to be updated based on the identity information of the object data to be updated in the step 240 may further include: obtaining the actual data of the object data to be updated if the user has the predefined operation privilege.

That is, only when the user has a corresponding operation privilege, can the metadata and/or the actual data of the object data to be updated be obtained. In this way, the access and/or modification to the object data by an unauthorized user can be prevented, and the security of the object data stored in the object storage system is guaranteed.

Figure 3:
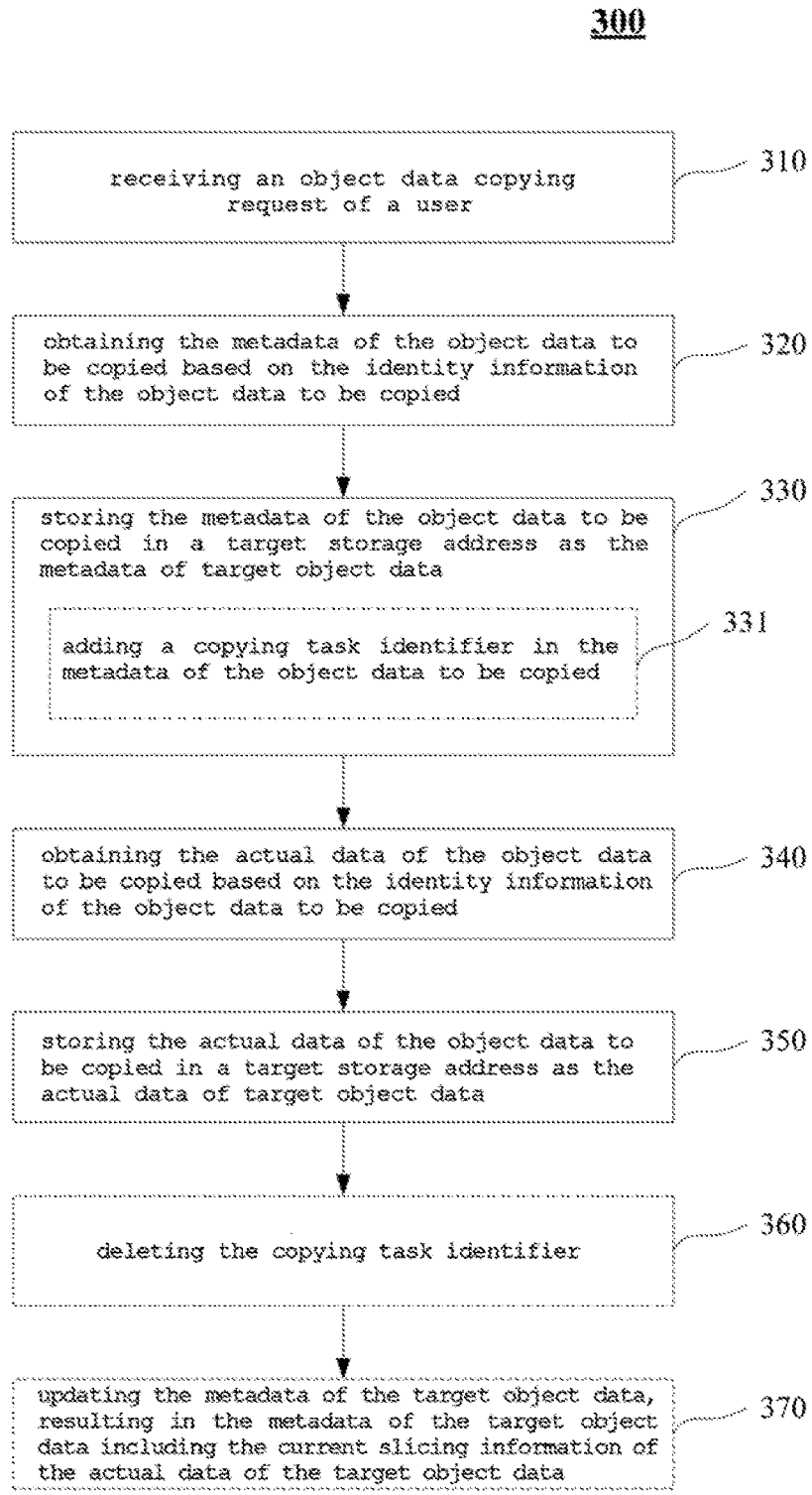
FIG. 3 is a flowchart illustrating an object data updating method in an object storage system according to another embodiment of the present application.

FIG. 3 shows a process 300 of an object data updating method in an object storage system according to another embodiment of the present application.

In the embodiment, the type of the updating request may include a copying request, and correspondingly, the object data to be updated may include object data to be copied.

The method in the embodiment may include the following steps:

Step 310, an object data copying request of the user is received. The object data copying request includes the identity information of the object data to be copied. Herein, the identity information of the object data to be copied, for example, may include source storage address information and target storage address information of the object data to be copied.

Step 320, the metadata of the object data to be copied is obtained based on the identity information of the object data to be copied.

Step 330, the metadata of the object data to be copied is stored in a target storage address as the metadata of target object data.

It can be seen that, after the metadata of the object data to be copied is stored in the target storage address, since the metadata still contains the description information of the object data to be copied, although the copying operation of the object data to be copied is not completed at this time, the user may still access the actual data of the object data to be copied stored in a source storage address through the metadata in the target storage address.

Step 340, the actual data of the object data to be copied is obtained based on the identity information of the object data to be copied.

Step 350, the actual data of the object data to be copied is stored in a target storage address as the actual data of the target object data.

By means of the above steps 310 to 350, the metadata and the actual data of the object data to be copied may be respectively copied to the target storage address as the metadata of the target object data and the actual data of the target object data. In addition, the metadata and the actual data of the object data to be copied is respectively operated, so that in a copying process, if the user makes other operation requests to the same object data, the object storage system may still access the actual data of the object data to be copied through the metadata of the object data to be copied, instead of responding to the user's operation request after completing a copying task, so that the response speed to the user's operation request is improved.

In some application scenarios, during the process that the object storage system copies the metadata and/or the actual data of the object data to be copied in response to the object data copying request of the user A, the other user B of the object storage system may initiate a deletion request to the same object data in the object storage system. In order to avoid deleting the object data responding to the deletion request of the user B before completion of the copying operation on the object data executed in response to the object data copying request of the user A, in some optional implementations, a copying task identifier may be added in the metadata of the object data to be copied (step 331), and after completion of executing the step 350 of copying the actual data of the object data to be copied to the target storage address to generate the actual data of the target object data, the copying task identifier is deleted (step 360).

In this way, when the user B initiates an object data deletion request, the metadata of object data corresponding to the deletion request contains the copying task identifier, which indicates that the object data is in the copying operation at present. At this time, executing the operation corresponding to the object data deletion request initiated by the user B may be paused, and after the copying task identifier in the metadata is deleted, a corresponding operation is executed for the object data deletion request initiated by the user B.

In some optional implementations, the metadata of the object data to be copied may include current slicing information of the actual data of the object data to be copied. After completion of the step 350 of storing the actual data of the object data to be copied in the target storage address as the actual data of the target object data, the method of the embodiment may further include a step 370 of updating the metadata of the target object data, resulting in the metadata of the target object data including the current slicing information of the actual data of the target object data.

Figure 4:
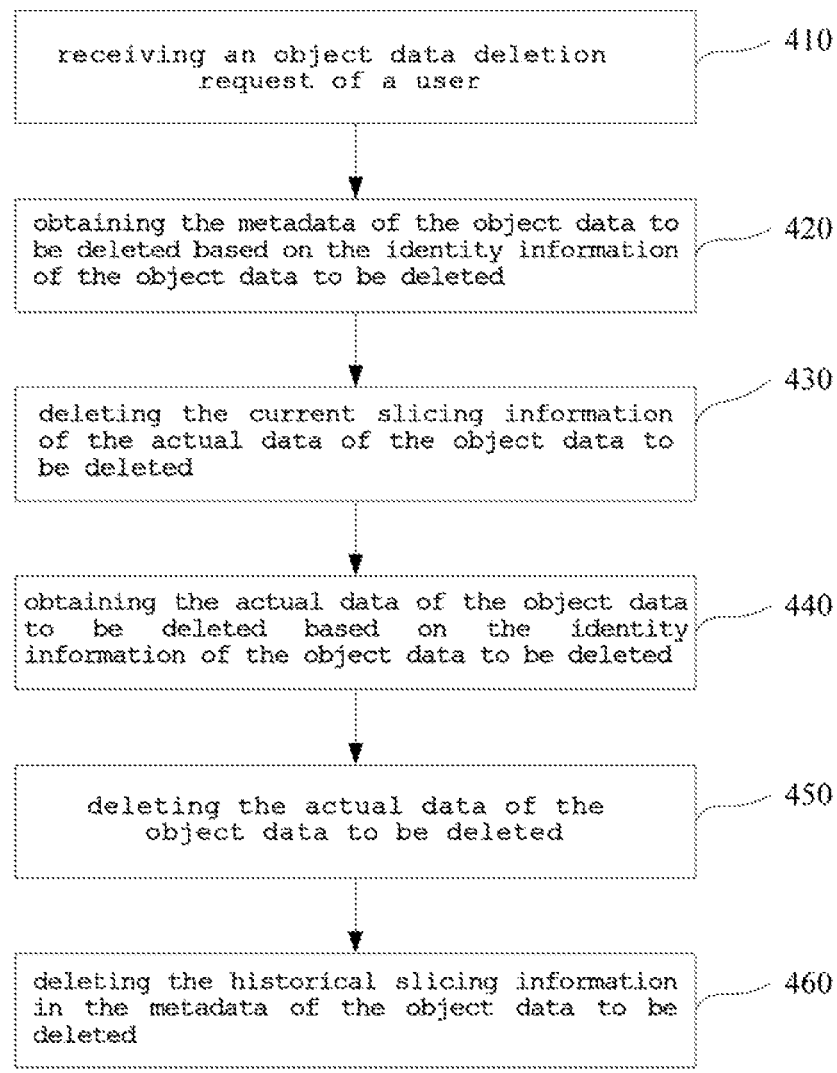
FIG. 4 is a flowchart illustrating an object data updating method in an object storage system according to yet another embodiment of the present application.

FIG. 4 shows a process 400 of an object data updating method in an object storage system according to yet another embodiment of the present application.

In the embodiment, the type of the updating request may include a deletion request, and correspondingly, the object data to be updated include object data to be deleted.

The method in the embodiment may include the following steps:

Step 410, an object data deletion request of the user is received, and the object data deletion request includes the identity information of the object data to be deleted.

Step 420, the metadata of the object data to be deleted is obtained based on the identity information of the object data to be deleted. Herein, the metadata of the object data to be deleted may include current slicing information of the actual data of the object data to be deleted and historical slicing information of the actual data of the object data to be deleted. The historical slicing information contains related information on updating the object data by the user. Every time the user updates the object data, a piece of historical slicing information corresponding to the updating may be generated.

Step 430, the current slicing information of the actual data of the object data to be deleted is deleted.

After the current slicing information of the actual data of the object data to be deleted is deleted, the user cannot access the object data any more. Therefore, for the user, after the step 430 is completed, the deletion operation of the object data may be deemed as completed.

Step 440, the actual data of the object data to be deleted is obtained based on the identity information of the object data to be deleted.

Step 450, the actual data of the object data to be deleted is deleted.

After the actual data of the object data to be deleted is deleted, a corresponding storage area in the object storage system is released, and thus may be used for storing other object data.

In some optional implementations, after the actual data of the object data to be deleted is deleted, the object data updating method in the object storage system of this embodiment may further include:

Step 460, deleting the historical slicing information in the metadata of the object data to be deleted. After the historical slicing information is deleted, all contents contained in the object data are deleted, and the corresponding storage area in the object storage system is maximumly released.

Figure 5:
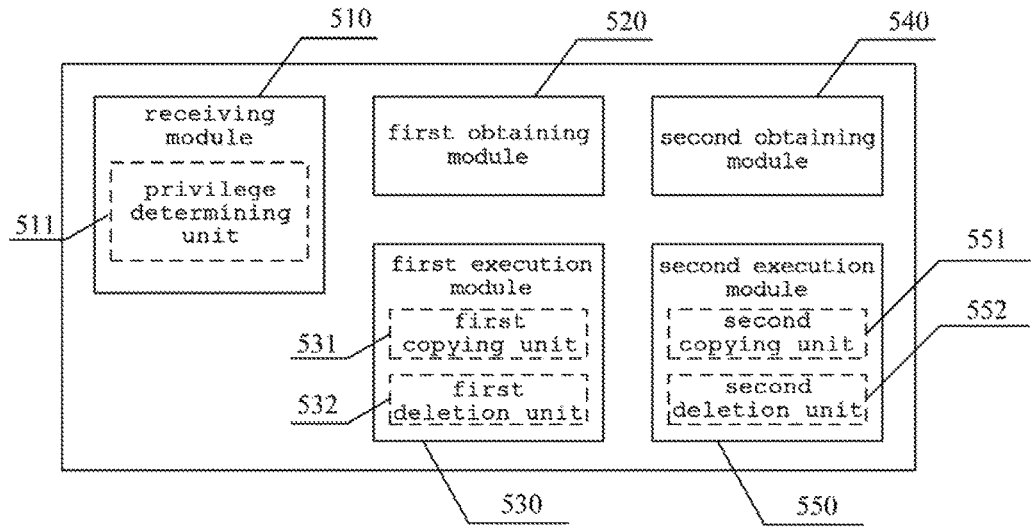
FIG. 5 schematically illustrates the structure of an object data updating apparatus in an object storage system according to an embodiment of the present application.

Further referring to FIG. 5, as an implementation of the methods shown in the above figures, an object data updating apparatus 500 in an object storage system according to an embodiment of the present application is provided. The embodiment of the apparatus corresponds to the embodiment of the method as shown in FIG. 2, and the apparatus may be specifically applied to various electronic devices.

In the embodiment, the object data updating apparatus in the object storage system includes a receiving module 510, a first obtaining module 520, a first execution module 530, a second obtaining module 540 and a second execution module 550.

In the embodiment, multiple object data is stored in the object storage system, and each object data includes metadata and actual data stored in slices.

The receiving module 510 may be configured to receive an object data updating request of a user, wherein the object data updating request includes a type of the updating request and identity information of object data to be updated.

The first obtaining module 520 may be configured to obtain the metadata of the object data to be updated based on the identity information of the object data to be updated.

The first execution module 530 may be configured to execute a first predefined operation on the metadata of the object data to be updated based on the type of the updating request.

The second obtaining module 540 may be configured to obtain the actual data of the object data to be updated based on the identity information of the object data to be updated.

The second execution module 550 may be configured to execute a second predefined operation on the actual data of the object data to be updated based on the type of the updating request.

In some optional implementations, the type of the updating request may include a copying request, and the identity information of object data to be updated may include source storage address information and target storage address information of the object data to be copied.

In some optional implementations, the first execution module 530 may further include a first copying unit 531 configured to store the metadata of the object data to be copied in a target storage address as the metadata of the target object data.

In addition, in these optional implementations, the second execution module 550 may further include a second copying unit 551 configured to store the actual data of the object data to be copied in the target storage address as the actual data of the target object data.

In some optional implementations, the first copying unit 531 may be further configured to add a copying task identifier in the metadata of the object data to be copied.

In some optional implementations, the metadata of the object data to be copied may further include current slicing information of the actual data of the object data to be updated. The object data updating apparatus in the object storage system of this embodiment may further include a metadata updating module (not shown in the figure) configured to, after the second copying unit 551 stores the actual data of the object data to be copied in the target storage address as the actual data of the target object data, delete the copying task identifier, and update the metadata of the target object data, resulting in the metadata of the target object data including the current slicing information of the actual data of the target object data.

In some optional implementations, the type of the updating request may include a deletion request. The metadata of the object data to be deleted may include current slicing information of the actual data of the object data to be deleted and historical slicing information of the actual data of the object data to be deleted.

In these optional implementations, the first execution module 530 may further include a first deletion unit 532 configured to delete the current slicing information in the metadata of the object data to be deleted. The second execution module 550 may further include a second deletion unit 552 configured to delete the actual data of the object data to be deleted.

In some optional implementations, the second deletion unit 552 may be further configured to delete the historical slicing information in the metadata of the object data to be deleted after the actual data of the object data to be deleted is deleted.

In some optional implementations, the object data updating request includes user identity information. In these optional implementations, the receiving module 510 may further include a privilege determining unit 511 configured to determine operation privilege of the user based on the user identity information. In these optional implementations, the first execution module 530 may be further configured to obtain the metadata of the object data to be updated based on the predefined operation privilege of the user determined by the privilege determining unit 511. The second execution module 550 may be further configured to obtain the actual data of the object data to be updated based on the predefined operation privilege of the user determined by the privilege determining unit 511.

Those skilled in the art may understand that, the object data updating apparatus 500 in the object storage system further includes some other known structures, such as a processor, a memory and the like, and in order not to unnecessarily obscure the embodiments of the present disclosure, these known structures are not shown in FIG. 5.

Figure 6:
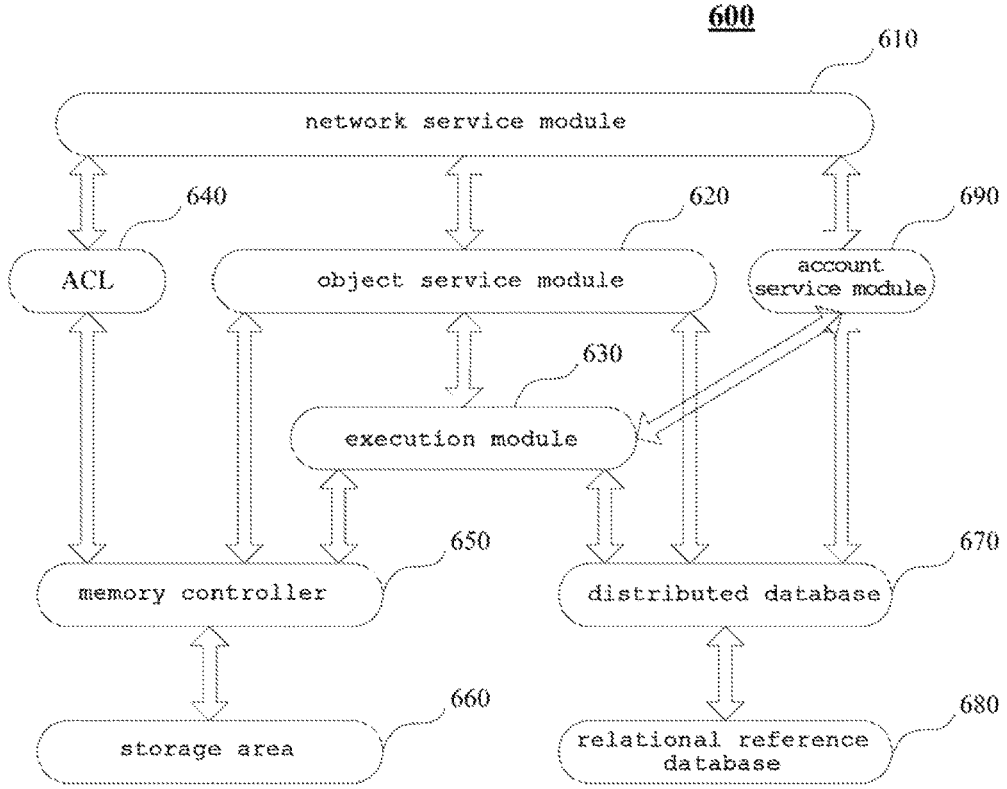
FIG. 6 illustrates the architecture of an object storage system according to an embodiment of the present application.

With reference to FIG. 6, it illustrates the architecture of an object storage system 600 according to an embodiment of the present application.

In the object storage system as shown in FIG. 6, the actual data of the object data may be stored in a storage area 660, while the metadata of the object data, for example, may be stored in the storage area 660 and/or a relational reference database 680. The storage area 660, for example, may be a distributed KV (Key-Value) memory.

A network service module 610 may receive an object data updating request of the user and transmit the updating request to an object service module 620.

In some application scenarios, if the updating request is a copying request, the object service module 620 firstly copies the metadata of the object data as the metadata of the target object data (for example, the storage area 660 may be accessed by a memory controller 650 to obtain the corresponding metadata, or the relational reference database 680 may be accessed by a distributed database 670 to obtain the corresponding metadata), and adds a copying task identifier in the metadata. Then, the object service module 620 initiates a data copying task to an execution module 630. The execution module 630 copies the actual data of the object data to be copied to a target storage position in response to the data copying task initiated by the object service module 620. After copying the actual data of the object data to be copied, the metadata of the target object data is updated, resulting in the metadata of the target object data including the current slicing information of the actual data of the target object data.

In the other application scenarios, if the updating request is a deletion request, the object service module 620 deletes the current slicing information of the metadata of the object data to be deleted and initiates a data deletion task to the execution module 630. After the deletion of the current slicing information of the metadata of the object data to be deleted is completed, the user cannot access the object data any more. Then, the execution module 630 deletes the actual data of the object data to be deleted in response to the data deletion task initiated by the object service module 620. After the deletion of the actual data is completed, the execution module 630 deletes the historical slicing information in the metadata of the object data. So far, the object storage system completes the deletion the object data to be deleted and releases the storage space.

In addition, an ACL (Access Control List) unit 640 may also be used for confirming whether the user initiating the object data updating request has corresponding privilege If soothe user has the corresponding privilege, the object service module 620 and the execution module 630 may access corresponding object data through the memory controller 650; otherwise, the object service module 620 and the execution module 630 cannot access the corresponding object data through the memory controller 650. In this way, the security of the object data stored in the object storage system is guaranteed.

In addition, the execution module 630 may also accept the task (for example, cancellation of illegal accounts) initiated by an account service module 690 and execute a corresponding operation.

In some optional implementations, the execution module 630, for example, may include a management thread pool, a database, a task queue and an execution thread pool. The management thread pool may receive an externally initiated task and writes the task into the database and the task queue after receiving the task. The execution thread pool extracts the corresponding task from the task queue to execute the task and modifies the identifier (for example, the task is identified as completed) stored in the database after executing the task.

Figure 7:
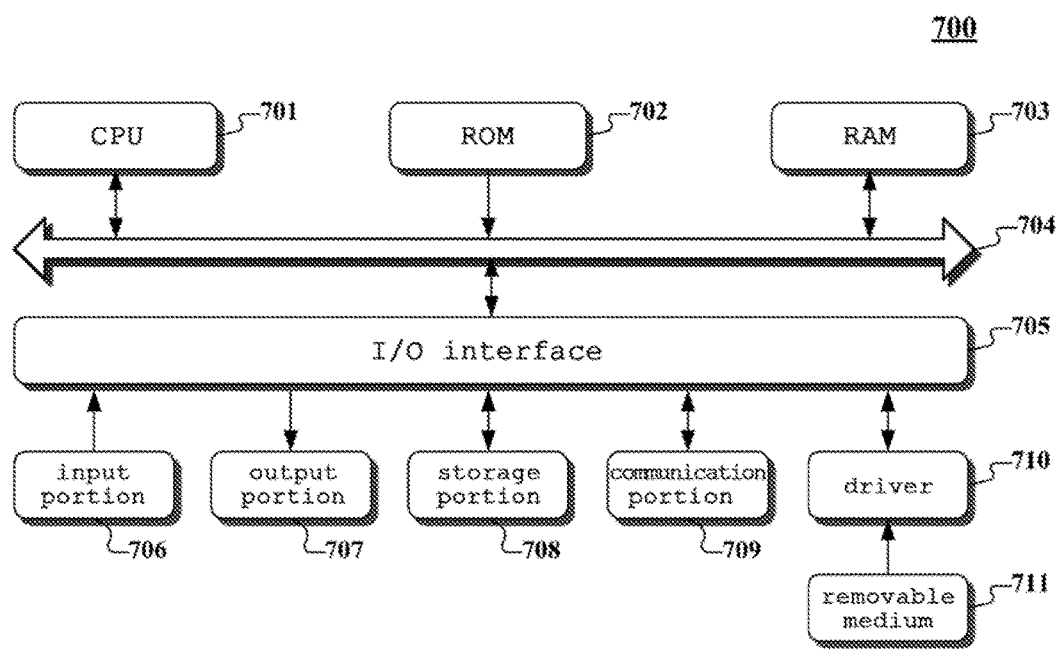
FIG. 7 illustrates a structural schematic diagram of a computer system adapted to implement an object data updating method or an object data updating apparatus of the embodiments of the present application.

Referring to FIG. 7, a schematic structural diagram of a computer system 700 adapted to implement a terminal apparatus or a server of the embodiments of the present application is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 709, and/or may be installed from the removable media 711. The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first obtaining module, a first execution module, a second obtaining module and a second execution module, where the names of these units or modules are not considered as a limitation to the units or modules. For example, the receiving module may also be described as "a module for receiving an object data updating request of a user".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device: receives an object data updating request of a user, the object data updating request comprising a type of the updating request and identity information of the object data to be updated; obtains the metadata of the object data to be updated based on the identity information of the object data to be updated; executes a first predefined operation on the metadata of the object data to be updated based on the type of the updating request; obtains the actual data of the object data to be updated based on the identity information of the object data to be updated; and executes a second predefined operation on the actual data of the object data to be updated based on the type of the updating request.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. An object data updating method in an object storage system, the object storage system storing multiple object data, and each piece of the object data comprising metadata and actual data stored in slices; the method comprising:
   receiving an object data updating request of a user, the object data updating request comprising a type of the updating request and identity information of the object data to be updated, the type of the updating request comprising an operation to be performed on the object data, and the metadata comprising information related to the slices of the actual data,
      wherein the object data updating request comprises user identity information,
      wherein the receiving an object data updating request of a user comprises: determining operation privilege of the user based on the user identity information;
   obtaining the metadata of the object data to be updated based on the identity information of the object data to be updated,
      wherein the obtaining the metadata of the object data to be updated based on the identity information of the object data to be updated comprises: obtaining the metadata of the object data to be updated based on the predefined operation privilege of the user;
   executing the operation on the metadata of the object data to be updated based on the type of the updating request before executing the operation on the actual data of the object data;
   obtaining the actual data of the object data to be updated based on the identity information of the object data to be updated,
      wherein the obtaining the actual data of the object data to be updated based on the identity information of the object data to be updated comprises: obtaining the actual data of the object data to be updated based on the predefined operation privilege of the user; and
   executing the operation on the actual data of the object data to be updated based on the type of the updating request.

2. The method of claim 1, wherein the type of the updating request comprises a copying request, and the object data to be updated comprises object data to be copied; the identity information of object data to be updated comprises source storage address information and target storage address information of the object data to be copied;
   the executing the operation on the metadata of the object data to be updated based on the type of the updating request comprises: storing the metadata of the object data to be copied in a target storage address as the metadata of target object data; and
   the executing the operation on the actual data of the object data to be updated based on the type of the updating request comprises: storing the actual data of the object data to be copied in a target storage address as the actual data of the target object data.

3. The method of claim 2, wherein the storing the metadata of the object data to be copied in a target storage address as the metadata of the target object data comprises:
   adding a copying task identifier in the metadata of the object data to be copied.

4. The method of claim 3, wherein the metadata of the object data to be copied comprises current slicing information of the actual data of the object data to be updated;
   after copying the actual data of the object data to be copied to the target storage address to generate the actual data of the target object data, the method further comprises:
   deleting the copying task identifier; and
   updating the metadata of the target object data, resulting in the metadata of the target object data including the current slicing information of the actual data of the target object data.

5. The method of claim 1, wherein the type of the updating request comprises a deletion request, and the object data to be updated comprises object data to be deleted;
   the metadata of the object data to be deleted comprises current slicing information of the actual data of the object data to be deleted and historical slicing information of the actual data of the object data to be deleted;

the executing the operation on the metadata of the object data to be updated based on the type of the updating request comprises: deleting the current slicing information of the actual data of the object data to be deleted; and the executing the operation on the actual data of the object data to be updated based on the type of the updating request comprises:

deleting the actual data of the object data to be deleted.

6. The method of claim 5, wherein after deleting the actual data of the object data to be deleted, the method further comprises:

deleting the historical slicing information in the metadata of the object data to be deleted.

7. An object data updating apparatus in an object storage system, the object storage system storing multiple object data, and each piece of the object data comprising metadata and actual data stored in slices; the apparatus comprising:

a receiving module configured to receive an object data updating request of a user, the object data updating request comprising a type of the updating request and identity information of the object data to be updated, the type of the updating request comprising an operation to be performed on the object data, and the metadata comprising information related to the slices of the actual data, wherein the object data updating request comprises user identity information, wherein the receiving module further comprises a privilege determining unit configured to determine operation privilege of the user based on the user identity information;

a first obtaining module configured to obtain the metadata of the object data to be updated based on the identity information of the object data to be updated;

a first execution module configured to execute the operation on the metadata of the object data to be updated based on the type of the updating request before executing the operation on the actual data of the object data, wherein the first execution module is further configured to: obtain the metadata of the object data to be updated based on the predefined operation privilege of the user determined by the privilege determining unit;

a second obtaining module configured to obtain the actual data of the object data to be updated based on the identity information of the object data to be updated; and a second execution module configured to execute the operation on the actual data of the object data to be updated based on the type of the updating request, wherein the second execution module is further configured to: obtain the actual data of the object data to be updated based on the predefined operation privilege of the user determined by the privilege determining unit.

8. The apparatus of claim 7, wherein the type of the updating request comprises a copying request, the object data to be updated comprises object data to be copied, and the identity information of object data to be updated comprises source storage address information and target storage address information of the object data to be copied;

the first execution module comprises a first copying unit configured to store the metadata of the object data to be copied in a target storage address as the metadata of the target object data; and the second execution module comprises a second copying unit configured to store the actual data of the object data to be copied in a target storage address as the actual data of the target object data.

9. The apparatus of claim 8, wherein the first copying unit is further configured to:

add a copying task identifier in the metadata of the object data to be copied.

10. The apparatus of claim 9, wherein the metadata of the object data to be copied comprise current slicing information of the actual data of the object data to be updated;

the apparatus further comprises a metadata updating module configured to:

after the second copying unit stores the actual data of the object data to be copied in the target storage address as the actual data of the target object data, delete the copying task identifier, and update the metadata of the target object data, resulting in the metadata of the target object data including the current slicing information of the actual data of the target object data.

11. The apparatus of claim 7, wherein the type of the updating request comprises a deletion request, and the object data to be updated comprises object data to be deleted; the metadata of the object data to be deleted comprises current slicing information of the actual data of the object data to be deleted and historical slicing information of the actual data of the object data to be deleted;

the first execution module comprises a first deletion unit configured to delete the current slicing information in the metadata of the object data to be deleted; and the second execution module comprises a second deletion unit configured to delete the actual data of the object data to be deleted.

12. The apparatus of claim 11, wherein the second deletion unit is further configured to:

delete the historical slicing information in the metadata of the object data to be deleted after deleting the actual data of the object data to be deleted.

13. A non-transitory computer storage medium storing a computer program, which when executed by one or more computers, cause the one or more computers to perform an object data updating method in an object storage system, the object storage system storing multiple object data, and each piece of the object data comprising metadata and actual data stored in slices; the method comprising:

receiving an object data updating request of a user, the object data updating request comprising a type of the updating request and identity information of the object data to be updated, the type of the updating request comprising an operation to be performed on the object data, and the metadata comprising information related to the slices of the actual data, wherein the object data updating request comprises user identity information, wherein the receiving an object data updating request of a user comprises:

determining operation privilege of the user based on the user identity information;

obtaining the metadata of the object data to be updated based on the identity information of the object data to be updated, wherein the obtaining the metadata of the object data to be updated based on the identity information of the object data to be updated comprises: obtaining the metadata of the object data to be updated based on the predefined operation privilege of the user;

executing the operation on the metadata of the object data to be updated based on the type of the updating request before executing the operation on the actual data of the object data;

obtaining the actual data of the object data to be updated based on the identity information of the object data to be updated,
  wherein the obtaining the actual data of the object data to be updated based on the identity information of the object data to be updated comprises: obtaining the actual data of the object data to be updated based on the predefined operation privilege of the user; and executing the operation on the actual data of the object data to be updated based on the type of the updating request.

* * * * *